(12) United States Patent
Sergyeyenko et al.

(10) Patent No.: US 11,511,356 B2
(45) Date of Patent: Nov. 29, 2022

(54) OSCILLATING TOOL

(71) Applicant: Black & Decker Inc., New Britain, CT (US)

(72) Inventors: Oleksiy P. Sergyeyenko, Baldwin, MD (US); Sean M. Bailey, Baltimore, MD (US)

(73) Assignee: Black & Decker Inc., New Britain, CT (US)

( * ) Notice: Subject to any disclaimer, the term of this patent is extended or adjusted under 35 U.S.C. 154(b) by 20 days.

(21) Appl. No.: 16/911,571

(22) Filed: Jun. 25, 2020

(65) Prior Publication Data

US 2021/0008643 A1 Jan. 14, 2021

Related U.S. Application Data

(60) Provisional application No. 62/873,431, filed on Jul. 12, 2019.

(51) Int. Cl.
| | |
|---|---|
| *B23B 31/19* | (2006.01) |
| *B23B 31/24* | (2006.01) |
| *B25F 3/00* | (2006.01) |
| *B24B 23/04* | (2006.01) |
| *B24B 45/00* | (2006.01) |

(52) U.S. Cl.
CPC .............. *B23B 31/19* (2013.01); *B23B 31/24* (2013.01); *B24B 23/04* (2013.01); *B24B 45/006* (2013.01); *B25F 3/00* (2013.01); *Y10T 279/33* (2015.01)

(58) Field of Classification Search
CPC ......... B23B 31/10; B23B 31/19; B23B 31/24; B23D 61/006; B24B 23/02; B24B 23/022; B24B 23/04; B24B 45/006; B27B 19/006; B27B 5/30; Y10T 279/33; B25F 3/00
See application file for complete search history.

(56) References Cited

U.S. PATENT DOCUMENTS

| | | |
|---|---|---|
| 4,016,684 A | 4/1977 | Urda |
| 4,254,667 A | 3/1981 | Wong |
| | (Continued) | |

FOREIGN PATENT DOCUMENTS

| | | |
|---|---|---|
| DE | 202013006901 U1 | 11/2014 |
| EP | 3132898 A1 | 2/2017 |
| | (Continued) | |

OTHER PUBLICATIONS

EP EESR dated, Dec. 4, 2020 in corresponding EP application No. 20183560.0.

*Primary Examiner* — Eric A. Gates
(74) *Attorney, Agent, or Firm* — Stephen R. Valancius (57) ABSTRACT

An oscillating tool includes a housing, a motor housed in the housing and a clamp assembly operatively driven by the motor in an oscillating motion. The clamp assembly can hold an accessory such as a blade or sanding attachment, and the clamp assembly includes a first clamp and a second clamp. The oscillating tool also includes a clamp lever and an actuating lever. The clamp lever is operatively coupled to the first clamp to move the first clamp such that clamp assembly is moved from a closed position to an open position. The actuating lever is operatively coupled to the clamp lever to effect movement of the clamp lever, movement of the clamp lever causing the clamp assembly to move from the closed position to the open position.

17 Claims, 14 Drawing Sheets

(56) References Cited

U.S. PATENT DOCUMENTS

| | | | |
|---|---|---|---|
| 4,526,369 A | 7/1985 | Phelps | |
| 4,962,957 A | 10/1990 | Traber | |
| 5,263,283 A | 11/1993 | Rudolf et al. | |
| 5,489,285 A * | 2/1996 | Gohs | B23D 51/10 |
| | | | 606/176 |
| 5,601,483 A | 2/1997 | Rudolf et al. | |
| 6,158,528 A | 12/2000 | Izumisawa | |
| 6,695,072 B2 | 2/2004 | Izumisawa | |
| RE39,009 E | 3/2006 | Izumisawa | |
| 8,317,574 B2 | 11/2012 | Blickle et al. | |
| 8,960,688 B2 * | 2/2015 | Zhou | B24B 45/006 |
| | | | 279/141 |
| 9,061,410 B2 | 6/2015 | Zhou et al. | |
| 9,545,699 B2 | 1/2017 | Furusawa et al. | |
| 9,669,536 B2 * | 6/2017 | Ito | B24B 45/006 |
| 9,821,430 B2 | 11/2017 | Zhang et al. | |
| 9,950,227 B1 | 4/2018 | Faircloth | |
| 10,058,926 B2 * | 8/2018 | Aoki | B24B 45/006 |
| 10,124,461 B2 | 11/2018 | Kuehne et al. | |
| 10,144,110 B2 | 12/2018 | Furusawa et al. | |
| 2010/0197208 A1 * | 8/2010 | Blickle | B24B 45/006 |
| | | | 451/342 |
| 2012/0292864 A1 * | 11/2012 | Zhou | B24B 45/006 |
| | | | 279/141 |
| 2014/0245620 A1 | 9/2014 | Fankhauser et al. | |
| 2016/0184956 A1 | 6/2016 | Klabunde et al. | |
| 2017/0291277 A1 * | 10/2017 | Gao | B24B 45/006 |
| 2018/0243894 A1 * | 8/2018 | Wang | F16H 21/40 |
| 2019/0247973 A1 * | 8/2019 | Zhong | B24B 55/00 |
| 2021/0162512 A1 * | 6/2021 | Okada | B23B 31/1612 |
| 2021/0213550 A1 * | 7/2021 | Gao | B23D 61/006 |

FOREIGN PATENT DOCUMENTS

| | | |
|---|---|---|
| EP | 3216573 A1 | 9/2017 |
| WO | 2012089641 A1 | 7/2012 |

* cited by examiner

OSCILLATING TOOL

CROSS-REFERENCE TO RELATED APPLICATION

This application claims priority and benefit to U.S. Provisional Application No. 62/873,431, filed on Jul. 12, 2019, the entire contents of which are hereby incorporated herein by reference in their entirety.

BACKGROUND OF THE INVENTION

The present disclosure relates to power tools, an oscillating tool and a blade clamp configuration for an oscillating tool.

SUMMARY OF EMBODIMENTS OF THE INVENTION

Aspects of the present disclosure relate to a reciprocating saw, a gearcase cover, a gearcase cover assembly a gearcase assembly and methods and components related thereto.

According to one aspect there is an oscillating tool that includes a housing, a a motor housed in the housing and a clamp assembly operatively driven by the motor in an oscillating motion. The clamp assembly includes a first clamp and a second clamp, the clamp assembly being configured to hold an accessory.

A clamp lever, the clamp lever operatively coupled to the first clamp to move the first clamp such that clamp assembly is moved from a closed position to an open position.

An actuating lever, the actuating lever operatively coupled to the clamp lever to effect movement of the clamp lever, movement of the clamp lever causing the clamp assembly to move from the closed position to the open position.

The actuating lever may be operatively coupled to the clamp lever through a connector.

The connector may be a connecting strip.

The oscillating tool may further include an output shaft. The clamp assembly may be operatively driven by the motor through the output shaft. The output shaft has a first end and a second end. The clamp assembly may be disposed at the first end. The actuating lever may be disposed adjacent to the second end.

The oscillating tool may further include a locking lever, the locking lever configured to keep the clamp assembly in the open position.

The locking lever may be attached to the actuation lever.

The oscillating tool may further include a guide groove which guides movement of the clamp lever.

The first clamp may be a sliding clamp.

The second clamp may be a fixed clamp.

According to another aspect, there is an exemplary embodiment of an oscillating tool including a housing; a motor housed in the housing, the motor having a motor longitudinal axis; an output shaft driven by the motor in an oscillating motion, the output shaft having an output shaft longitudinal axis; a foot that receives a power supply for powering the motor; a clamp assembly operatively driven by the motor through the output shaft in an oscillating motion, the clamp assembly being configured to hold an accessory; a clamp lever; and an actuating lever. The clamp lever is operatively coupled to the actuating lever. The actuating lever is configured to be movable by a user. Movement of the actuating lever causes the clamp lever to move and cause the clamp assembly to change from a closed position to an open position.

The foot may be at a rear of the oscillating tool.

The clamp assembly may be at a front of the oscillating tool.

The actuating lever may be at a front of the oscillating tool.

The actuating lever and the clamp assembly are at a front of the oscillating tool.

The actuating lever may be at a top of the oscillating tool.

The clamp assembly may be at a bottom of the oscillating tool.

The oscillating tool may further include a locking lever, the locking lever configured to keep the clamp assembly in the open position.

The oscillating tool may further include a guide groove which guides movement of the clamp lever.

The clamp assembly may include a first clamp and a second clamp.

The first clamp may be a sliding clamp.

According to another aspect, there is an exemplary embodiment of an oscillating tool, the tool including a housing; a motor housed in the housing; a clamp assembly operatively driven by the motor in an oscillating motion, the clamp assembly being configured to hold an accessory. The oscillating tool may further include a clamp lever. The oscillating tool may further include an actuator, the actuator being remote from the clamp lever and effecting movement of the clamp lever so as to open the clamp assembly and allow the accessory to be inserted or removed from the clamp assembly.

These and other aspects of various embodiments of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only and are not intended as a definition of the limits of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

All closed-ended (e.g., between A and B) and open-ended (greater than C) ranges of values disclosed herein explicitly include all ranges that fall within or nest within such ranges. For example, a disclosed range of 1-10 is understood as also disclosing, among other ranged, 2-10, 1-9, 3-9, etc.

BRIEF DESCRIPTION OF THE DRAWINGS

For a better understanding of embodiments of the present invention as well as other objects and further features thereof, reference is made to the following description which is to be used in conjunction with the accompanying drawings, where.

DETAILED DESCRIPTION OF EXEMPLARY EMBODIMENTS OF THE INVENTION

Figure 1:
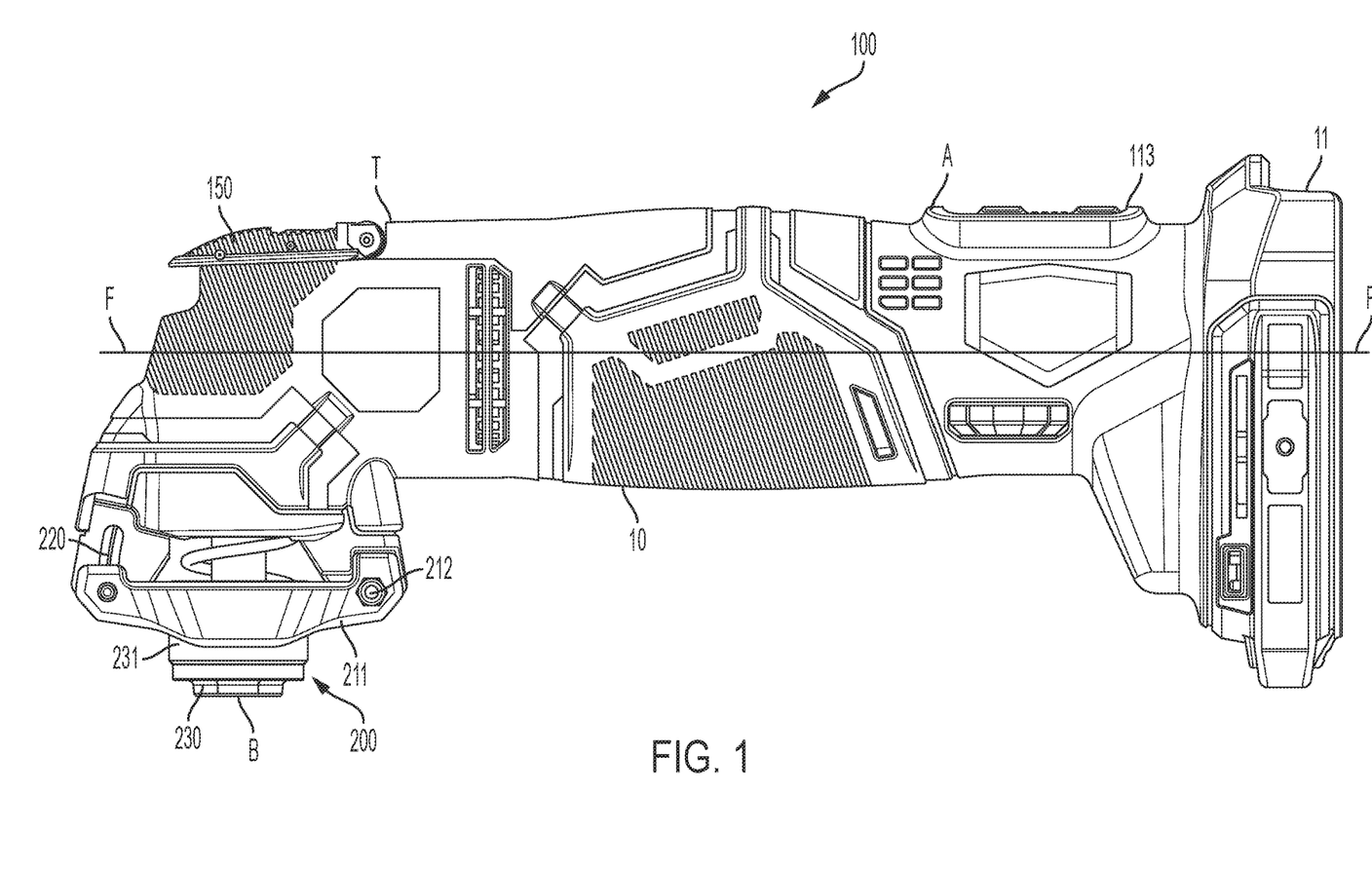
FIG. 1 is a side view of an oscillating tool according to an exemplary embodiment of the present application.

FIGS. 1-19 illustrate an exemplary embodiment of an oscillating tool 100 according to the present application. As shown in FIG. 1, the oscillating tool 100 includes a housing 10. There is a switch 113 on the housing for turning the oscillating tool 100 on and off. At a rear of the tool there is a battery foot 11. The battery foot receives a power tool battery pack (not shown) which provides power for the oscillating tool 100. The power tool battery pack may be of the type shown in, for example, U.S. Pat. Nos. 7,598,705; 7,661,486; or U.S. Patent Application Publication No. 2018/0331335. U.S. Pat. Nos. 7,598,705; 7,661,486; and U.S. Patent Application Publication No. 2018/0331335 are hereby incorporated by reference.

Figure 2:
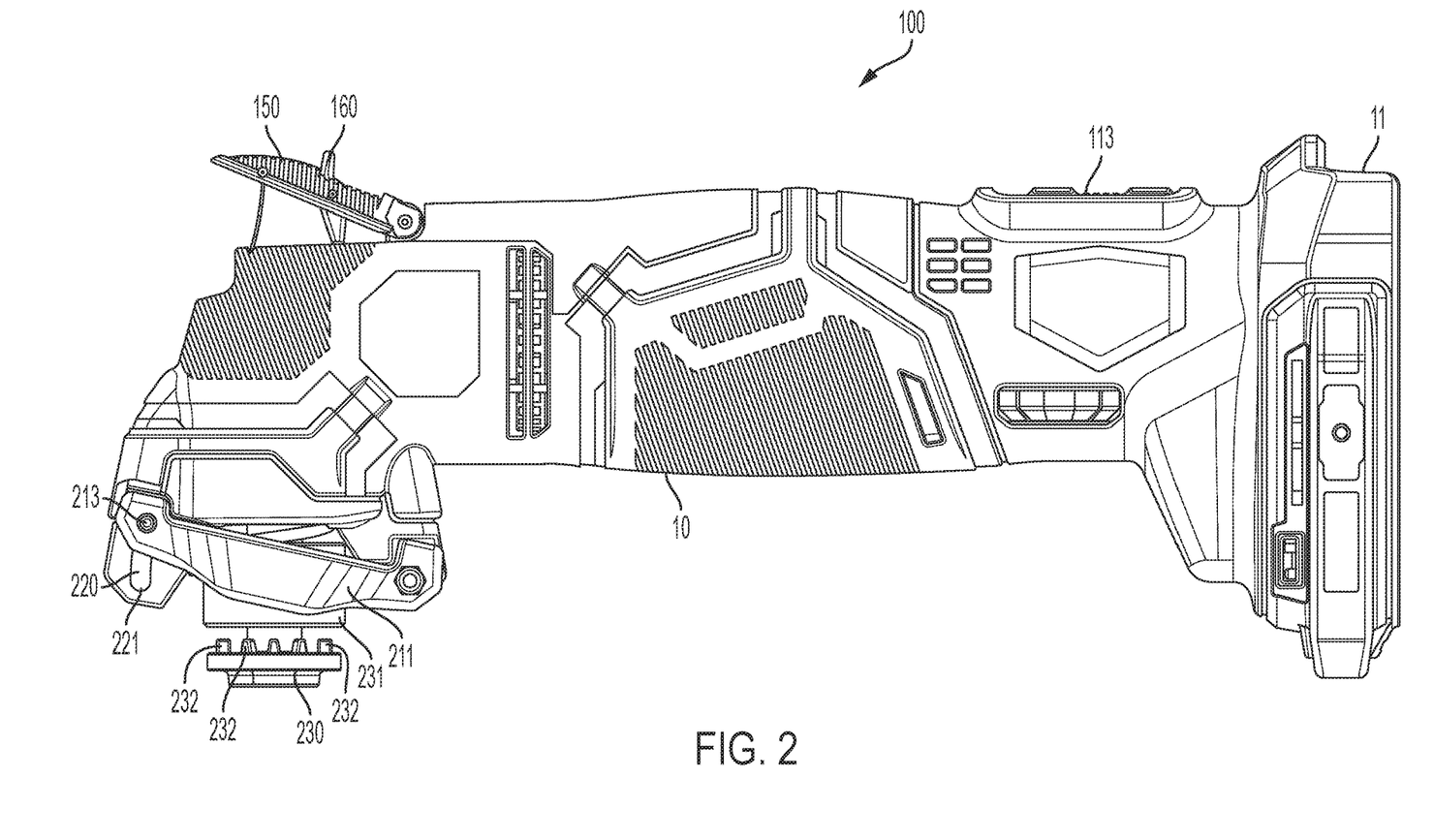
FIG. 2 is another side view of the exemplary embodiment of the oscillating tool.

As shown in FIGS. 1 and 2, the oscillating tool 100 includes a blade clamp assembly 200 that can be in a closed position as is shown in FIG. 1 or an open position as is shown in FIG. 2. In the open position, an accessory 250 (FIG. 19) can be inserted into the clamp assembly 200 or removed from the clamp assembly 200. In the closed position (e.g., FIGS. 1 and 19), the clamp assembly 200 clamps down on an accessory so that the accessory is firmly held in the clamp assembly 200 for cutting, sanding or the like. When the oscillating tool 100 is activated, the clamp assembly 200 moves the accessory in an oscillating motion. The accessory may be an oscillating tool blade, sanding attachment or other accessory. Examples of accessories and a basic operation of an oscillating tool are shown in prior art reference U.S. Patent Application Publication No. 2017/0173754. U.S. Patent Application Publication No. 2017/0173754 is hereby incorporated by reference. The clamp assembly 200 of the present application may hold an accessory such as the first and second accessories shown and described in U.S. Patent Application Publication No. 2017/0173754.

As shown in FIG. 1, the exemplary embodiment of the oscillating tool has a body with a longitudinal axis A. The blade clamp assembly 200 is at a front F of the oscillating tool 100 and the foot 11 is at a rear R of the oscillating tool 100.

The blade clamp assembly 200 includes a lower fixed clamp 230 and an upper sliding clamp 231. The lower clamp 230 has a series of lugs 232. The lugs 232 can engage with holes in an accessory being held. That is, the accessory may have an attachment portion with holes. The lugs 232 may extend through the holes providing an engagement. The holes may have a shape that corresponds with a cross-section of the lugs 232.

Figure 19:
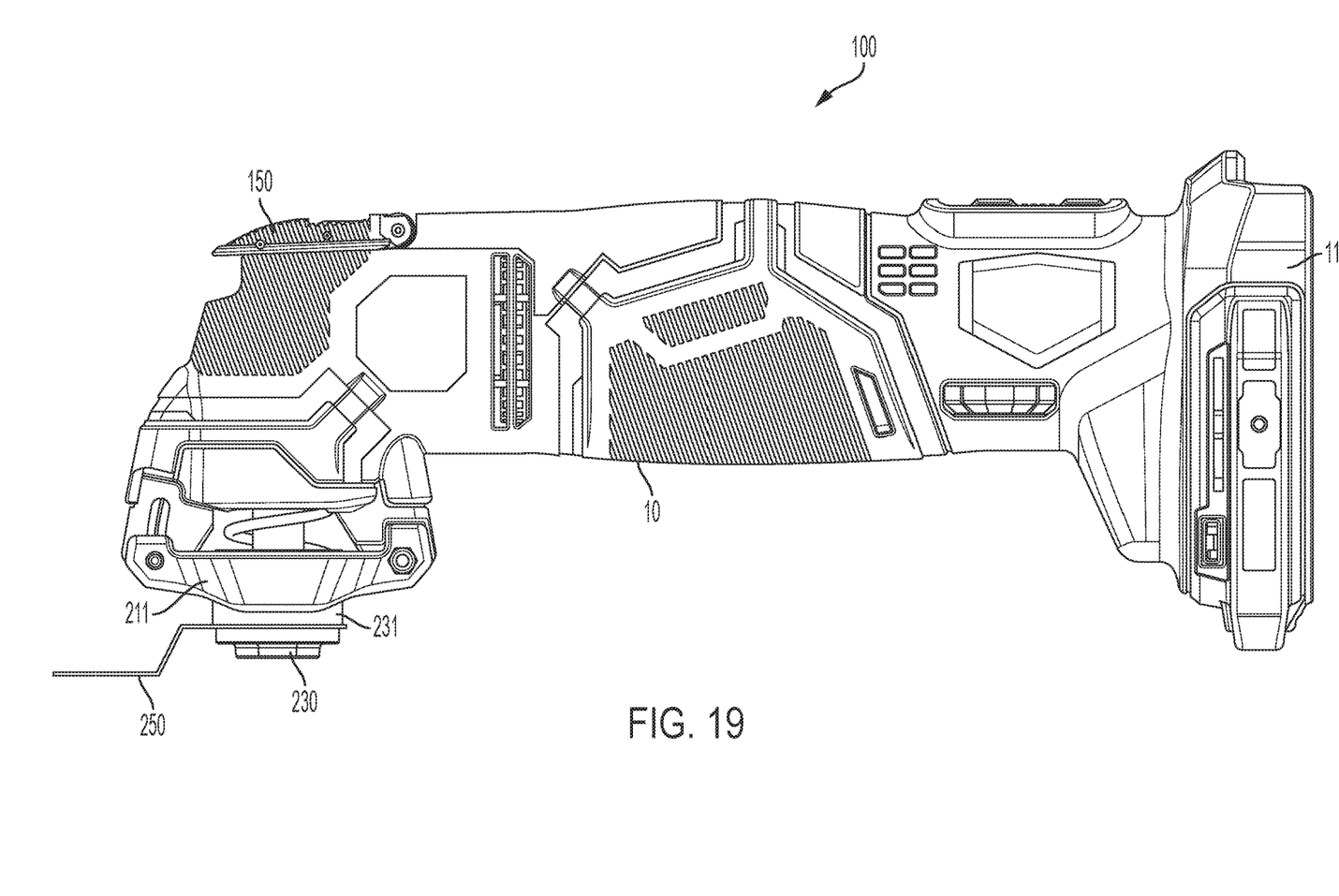
FIG. 19 is a side view of the oscillating tool of the exemplary embodiment holding an accessory.

As shown in FIGS. 1 and 2, the upper clamp 231 moves away from the lower clamp 230 in order to separate the lower clamp 230 and the upper clamp 231. This puts the clamp assembly 200 into the open position shown in FIG. 2. When the clamp assembly 200 is in the open position shown in FIG. 2, an attachment portion of an accessory may be inserted into the blade clamp assembly 200 between the lower clamp 230 and upper clamp 231. The clamp assembly 200 can then be moved towards the closed position shown in FIG. 1 which will secure the accessory between the lower and upper clamps 230, 231. FIG. 19 illustrates an accessory 250 secured in the clamp assembly 230 between clamp 230 and 231. As will be appreciated, the upper clamp 231 and the lower clamp 230 are separated by the thickness of the accessory when in the closed position and holding the accessory 250.

The oscillating tool 100 also includes an actuator lever 150 and a clamp lever 211. The actuator lever 150 is used to move the sliding clamp 231 and thus cause the clamp assembly 200 to move between the open and closed positions. A user may move the actuator lever 150 from the position of FIG. 1 to the position of FIG. 2. The actuator lever 150 is operatively connected to the clamp lever 211 such that when the actuator lever 150 is moved from the position of FIG. 1 to the position of FIG. 2, a front end of the clamp lever 211 moves up as well. The clamp lever 211 is in turn connected to the sliding clamp 231 and so the sliding clamp 231 also moves upwardly along with the clamp lever 211. The actuator lever 150 is rotationally secured to the housing 10.

The sliding clamp 231 can be connected to the clamp lever 211 in various ways. In the present exemplary embodiment, the clamp lever 211 projects inwardly and engages an outward projection 232 of the sliding clamp 231, as is shown in FIGS. 13, 14, 17 and 18. When the clamp lever 211 engages the outward projection 232 it pushes the outward projection 232 and thus the sliding clamp 231 upwardly against a biasing spring 50.

As is also shown in FIG. 2, the oscillating tool 100 may additionally include a locking lever 160. The locking lever 160 is rotationally connected to the actuator lever 150. FIG. 1 illustrates the locking lever 160 in the stored position. In the stored position the locking lever 160 is out of the way of the user. FIG. 2 illustrates the locking lever 160 in the locked position. As shown in FIG. 2, when the locking lever 160 is in the locked position, it contacts the housing 10 and prevents the actuator lever 150 from moving back towards the housing 10. Accordingly, the clamp assembly 200 is held in the open position shown in FIG. 2 without the user needing to hold the actuator lever 150 in this position. The locking lever 160 can be rotated back to the stowed position to allow the actuator lever 150 to return to the closed position of FIG. 1.

The clamp lever 211 is rotationally fixed to the housing 10 by a fixed rear pin 212. A movable front pin 213 is held in guide hole 220. The front pin 213 moves from a first end 221 of the guide hole 220 when the clamp assembly 200 is in the closed position to an upper end 222 when the clamp assembly is in a fully open position. As will be appreciated, when the clamp assembly 200 is holding an accessory, the pin 213 may not fully reach the end 221 due to the thickness of the accessory 250 separating the lower and upper clamps 230, 231. Additionally, it may be possible to insert at least some accessories without opening the clamp assembly 200 the full possible amount.

Figure 3:
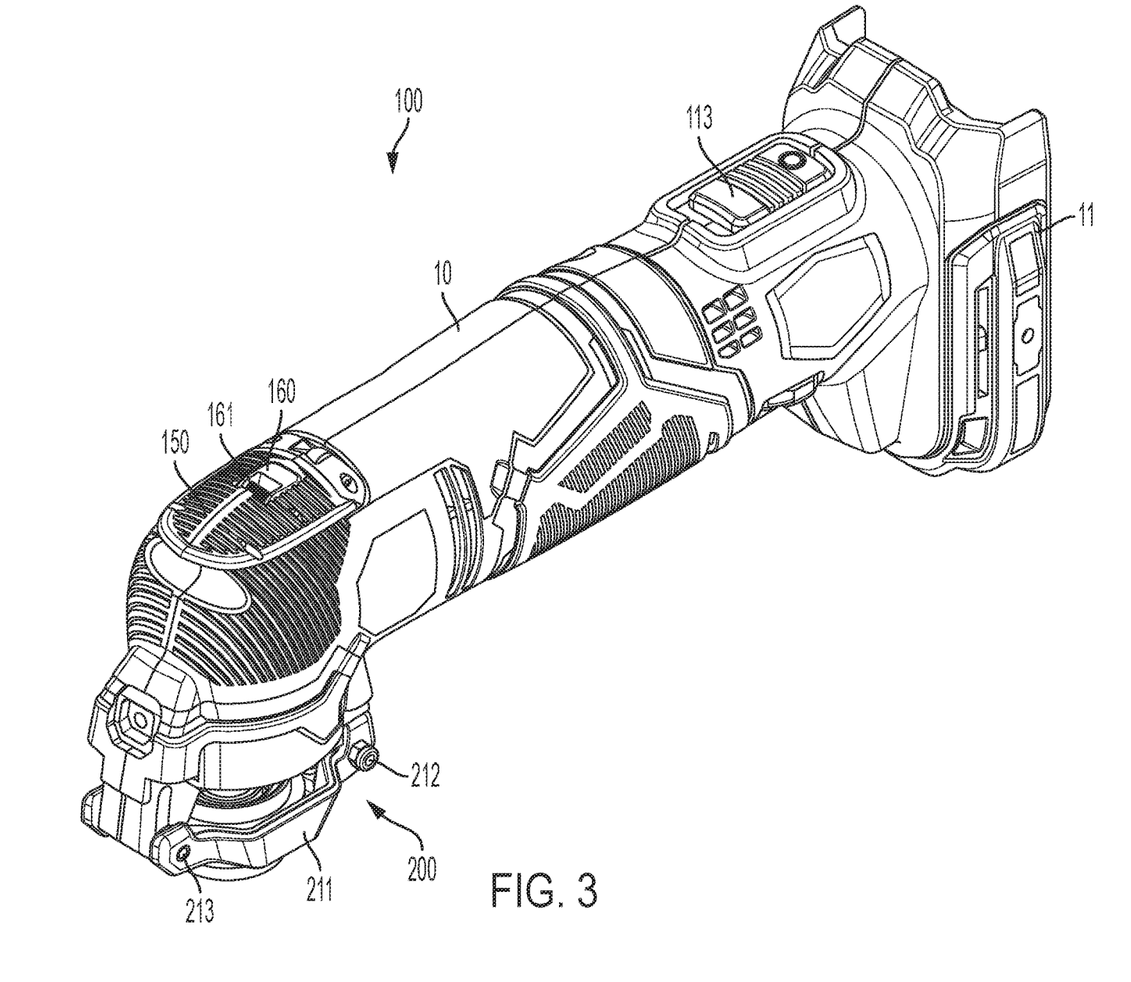
FIG. 3 is a perspective view of the exemplary embodiment of the oscillating tool.
Figure 4:
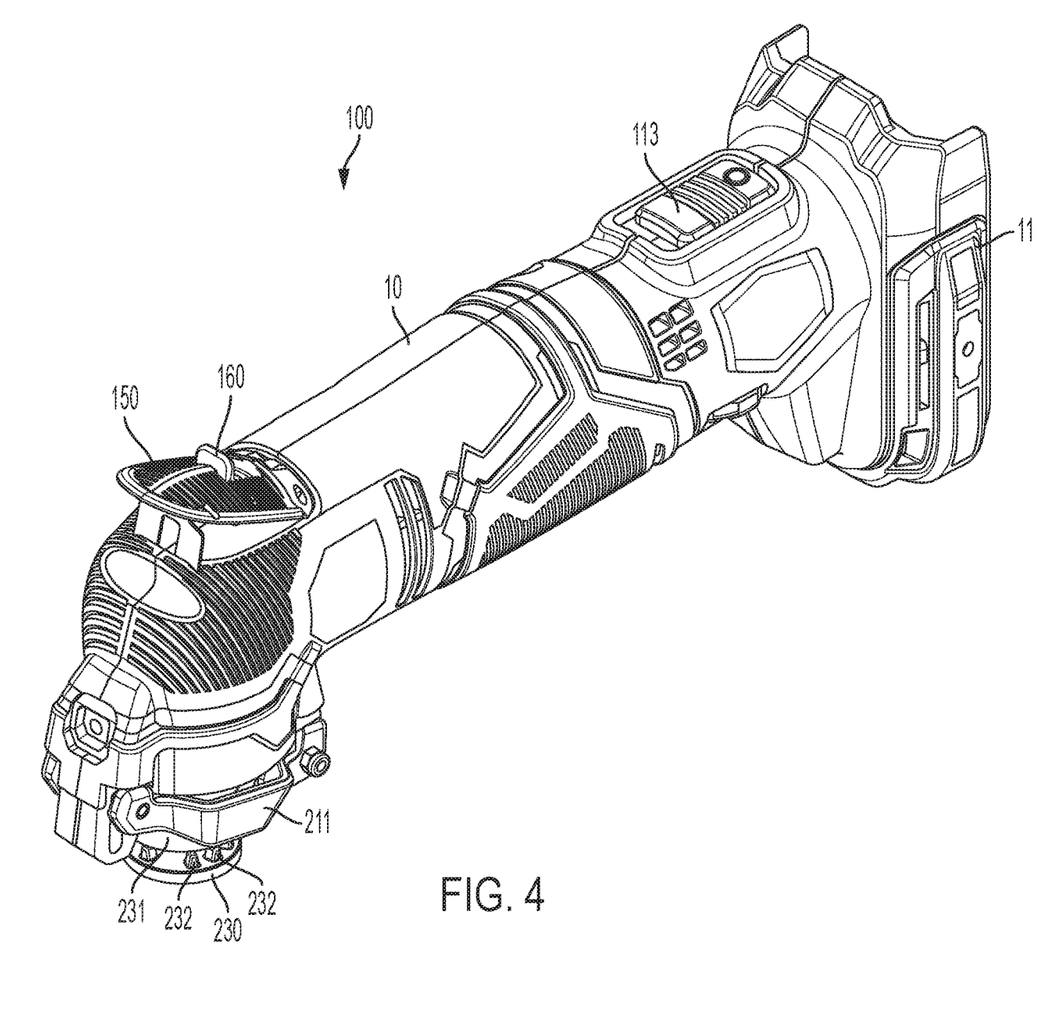
FIG. 4 is another perspective view of the exemplary embodiment of the oscillating tool.

FIG. 3 is a perspective view of the oscillating tool 100 with the clamp assembly 200 in the closed position. FIG. 4 is the same perspective view of the oscillating tool 100 with the clamp assembly 200 in the open position.

Figure 5:
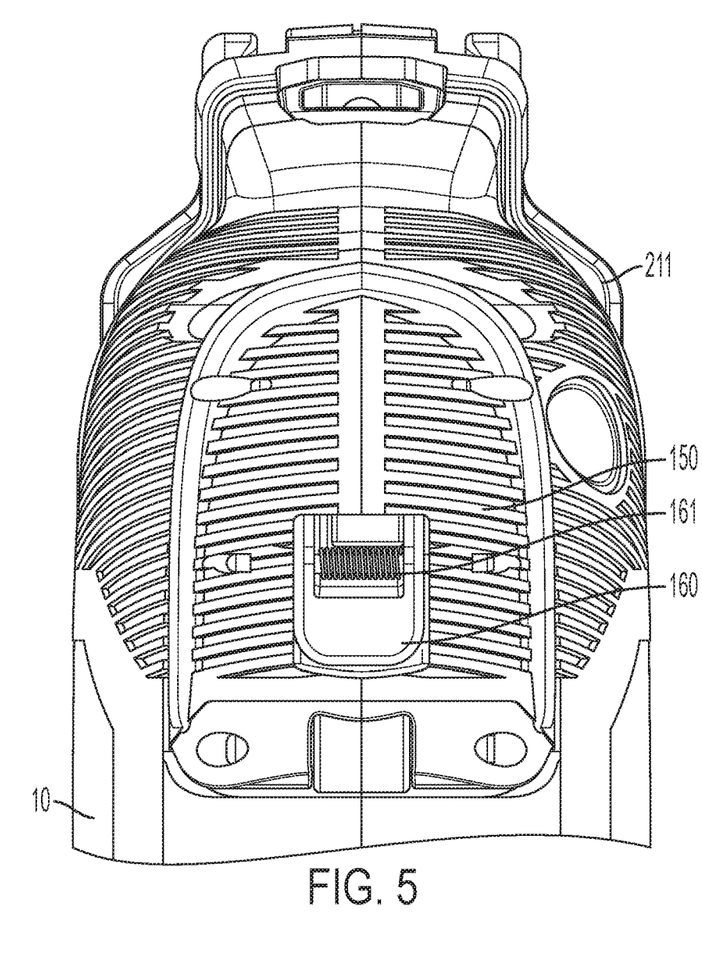
FIG. 5 is a top view of a portion of the exemplary embodiment of the oscillating tool.
Figure 6:
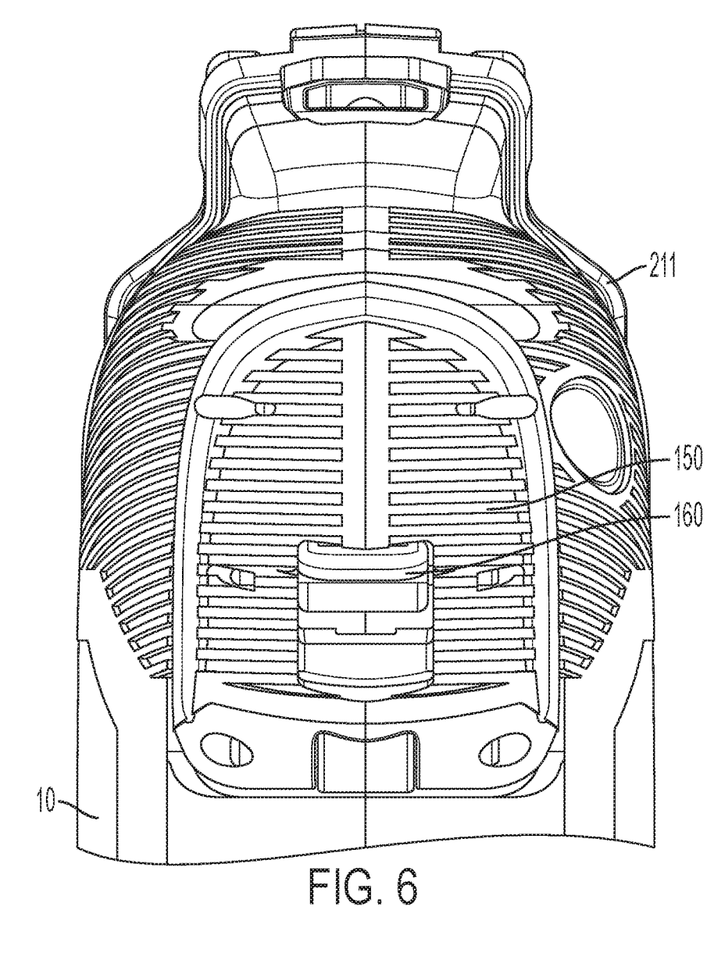
FIG. 6 is another top view of a portion of the exemplary embodiment of the oscillating tool.
Figure 7:
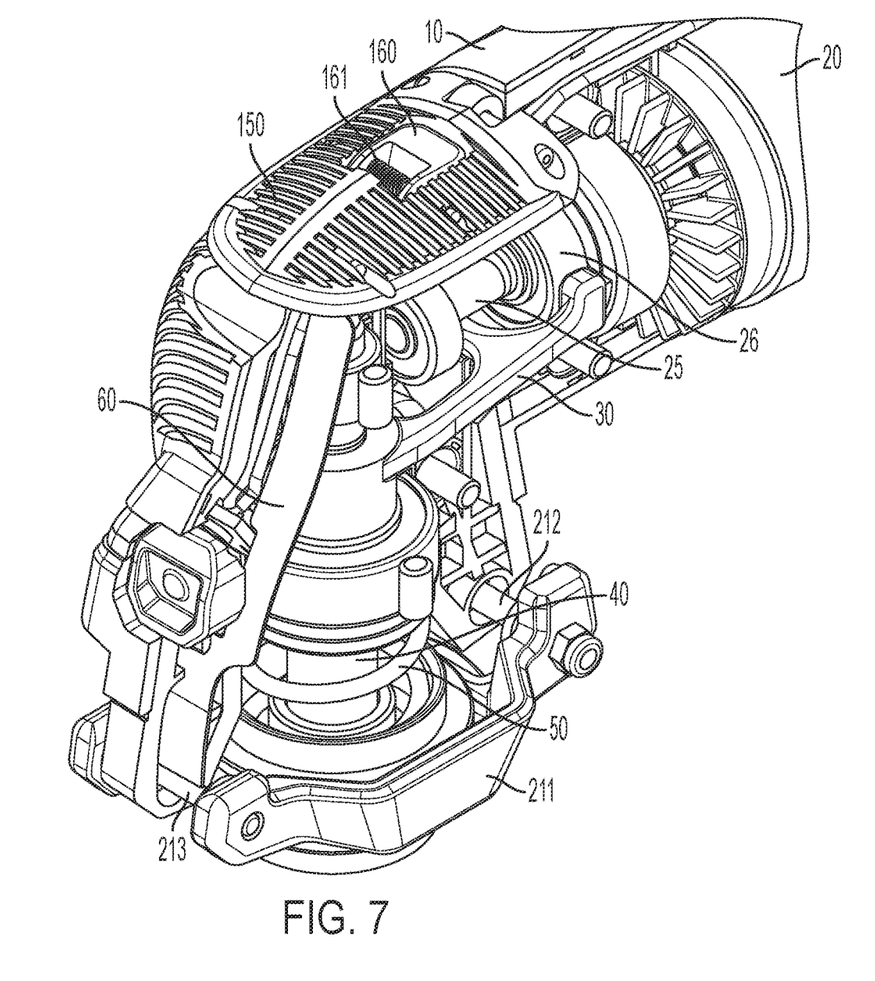
FIG. 7 is a perspective view of a portion of the oscillating tool of the exemplary embodiment.
Figure 8:
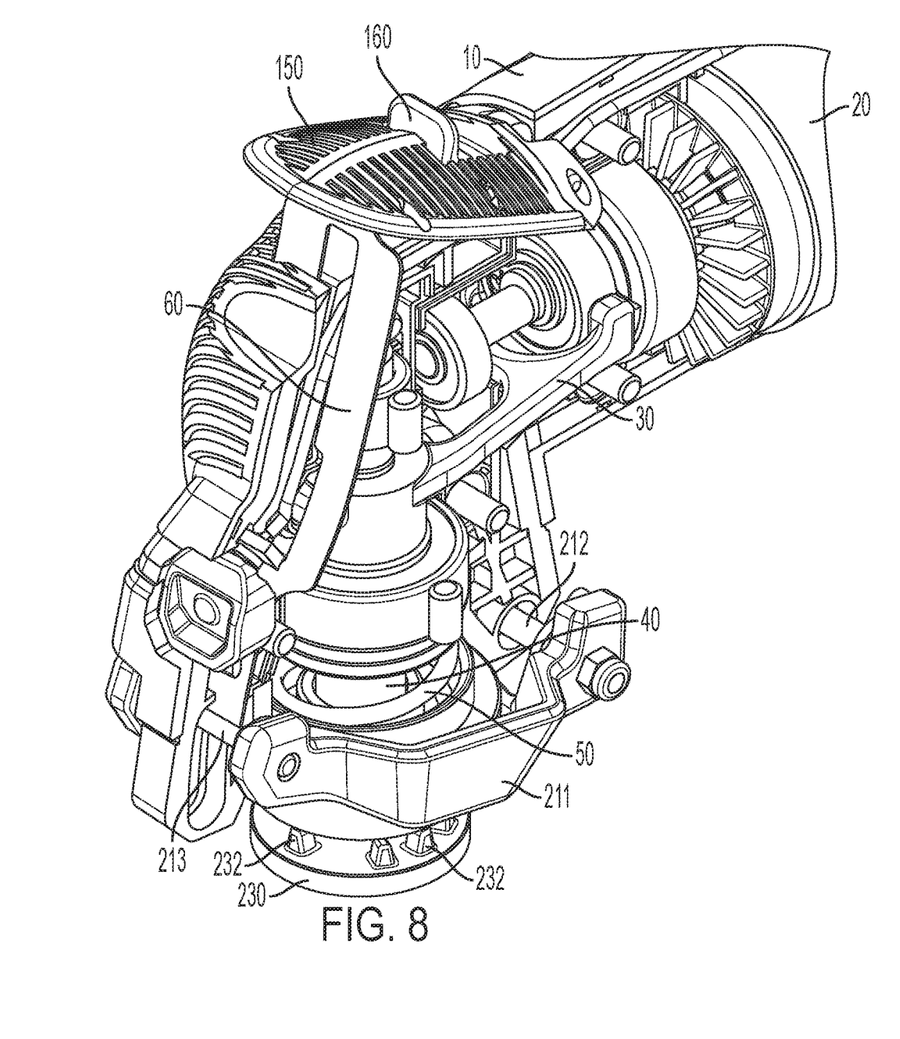
FIG. 8 is another perspective view of a portion of the oscillating tool of the exemplary embodiment.
Figure 9:
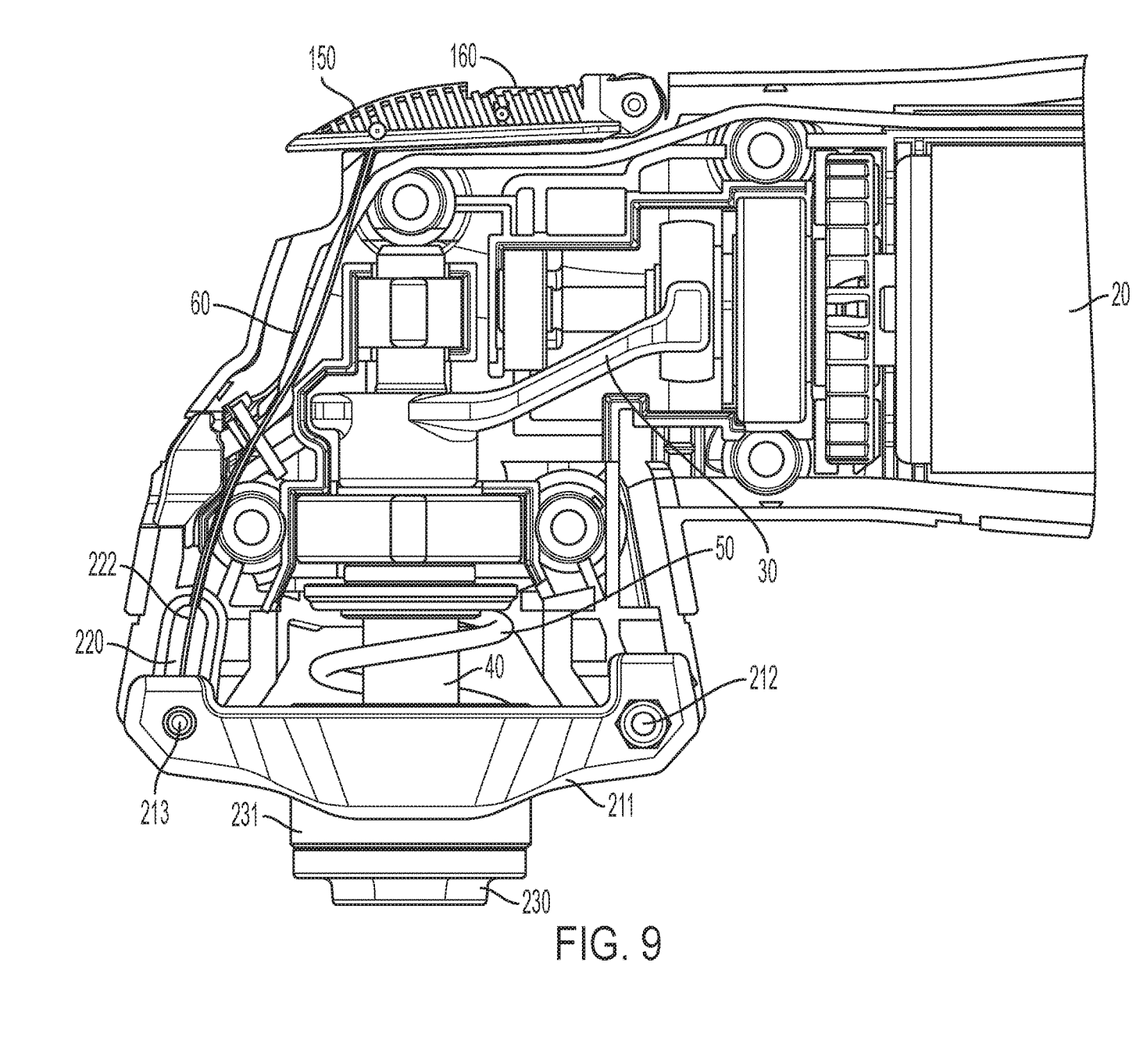
FIG. 9 is a side view of a portion of the oscillating tool of the exemplary embodiment.
Figure 10:
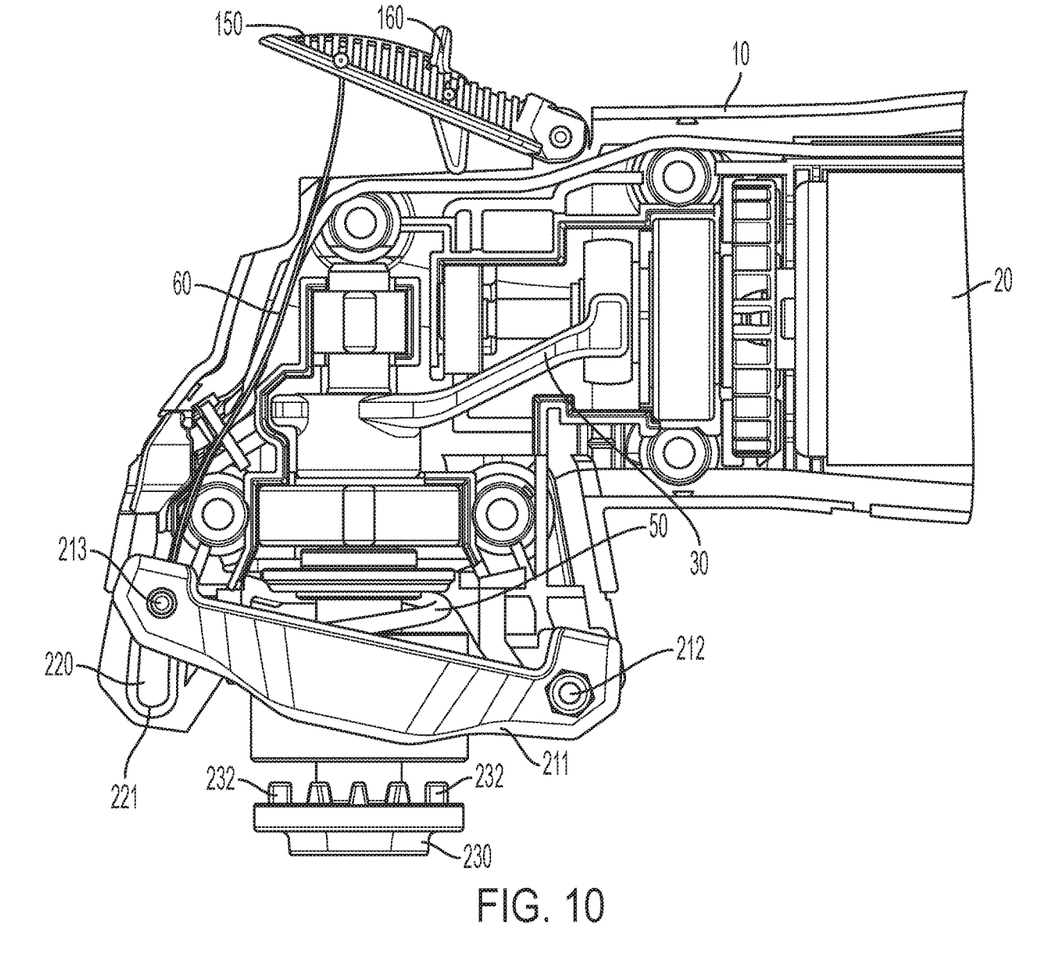
FIG. 10 is another side view of a portion of the oscillating tool of the exemplary embodiment.

FIGS. 5 and 6 are close-up views of the actuator lever 150 and the locking lever 160. In FIG. 5, the locking lever 160 is in the stored position and in FIG. 6 the locking lever 160 is in the locked position. As shown in FIG. 5, the locking lever 160 can be rotationally connected to the actuator lever 150 by a pin and spring assembly 161. The spring may be used to bias the locking lever to the stored position. In some embodiments the spring may be excluded.

FIGS. 7-10 illustrate a portion of the oscillating tool 100 with part of the housing 10 removed to illustrate the internals. As is shown in FIGS. 7-10, the motor has a motor output shaft 25 and there is an eccentric 26 on the output shaft 25. The output shaft 25 and eccentric 26 are rotationally driven by the motor 20. A fork 30 engages the eccentric 26 at one end and a tool output shaft 40 at the other end. The fork 30 converts the rotational motion of the eccentric 26 to an oscillating motion that the fork 30 imparts on the tool output shaft 40. In particular, the eccentric 26 pushes one end of the fork 30 back and forth. The other end of the fork 30 is fixedly connected to the output shaft 40 and rotates as the fork is pushed back and forth by the eccentric 26.

Figure 11:
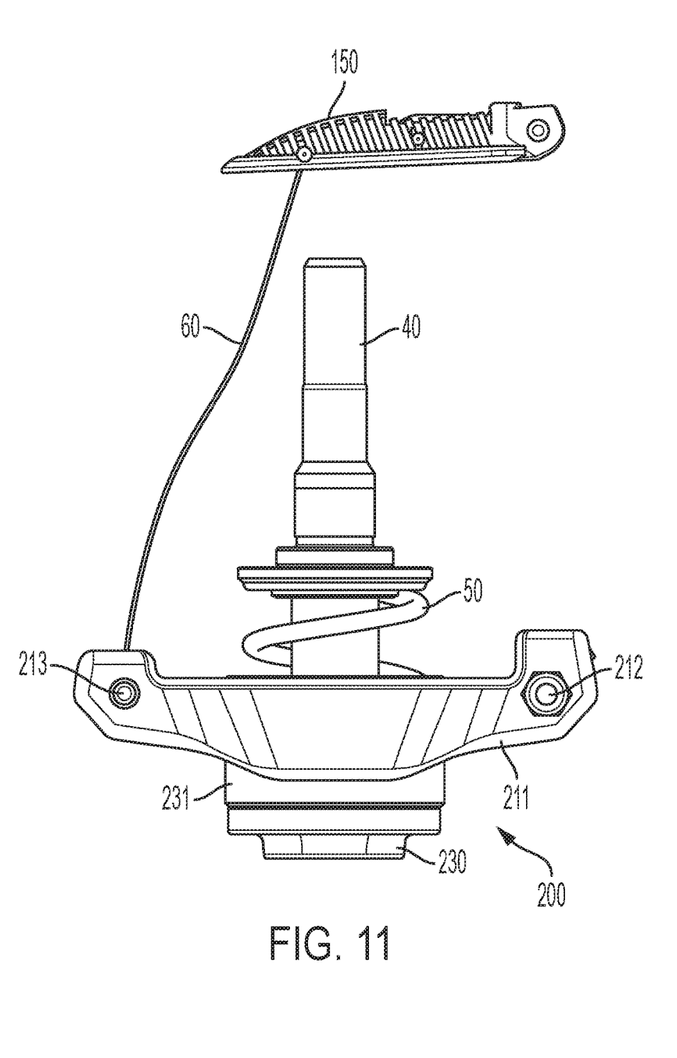
FIG. 11 is a side view of selected components of the oscillating tool of the exemplary embodiment.
Figure 12:
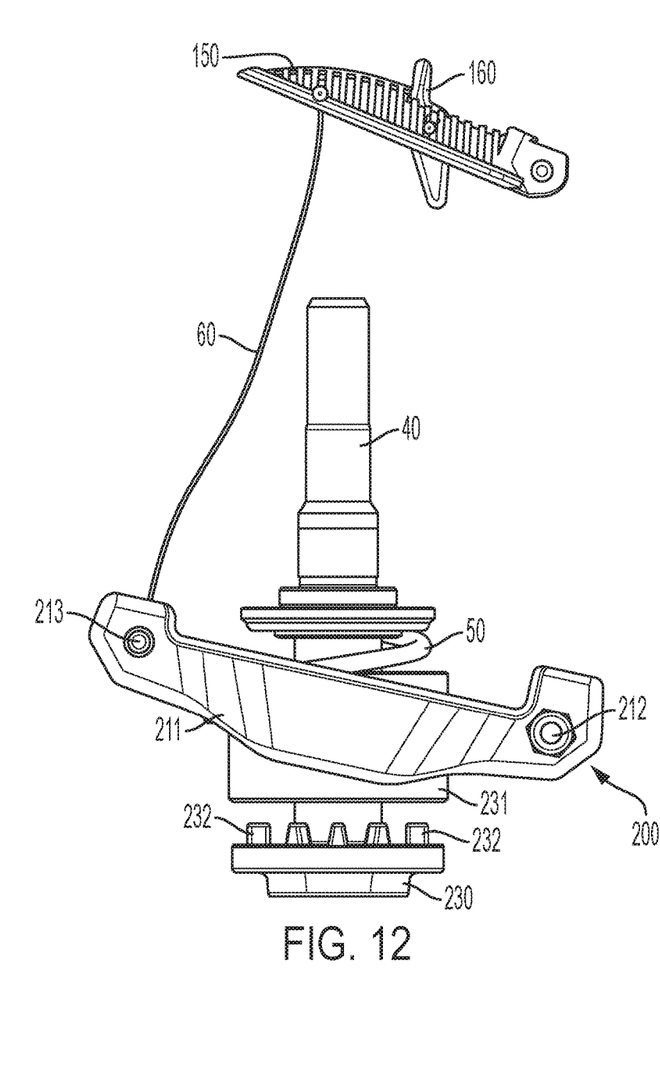
FIG. 12 is another side view of selected components of the oscillating tool of the exemplary embodiment.
Figure 13:
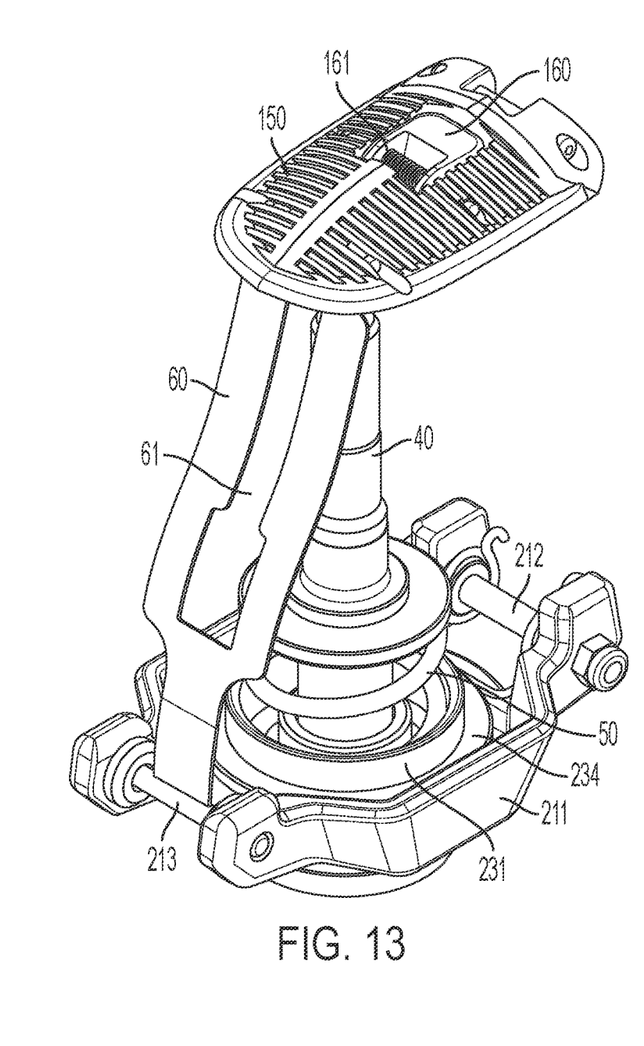
FIG. 13 is a perspective view of selected components of the oscillating tool of the exemplary embodiment.
Figure 14:
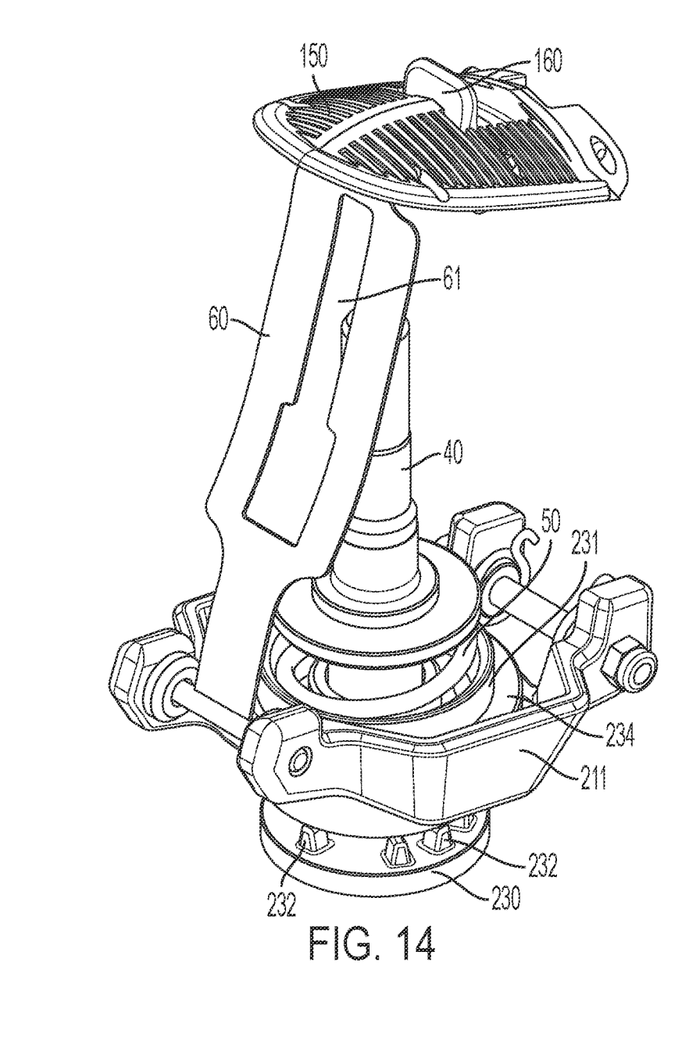
FIG. 14 is another perspective view of selected components of the oscillating tool of the exemplary embodiment.

FIGS. 11-14 illustrate the interaction of the actuator lever 150 and the clamp lever 211 and show selected parts of the oscillating tool 100. FIG. 11 is a side view with the clamp assembly 200 in a closed position and FIG. 12 is a side view with the clamp assembly 200 in an open position. FIG. 13 is a perspective view with the clamp assembly 200 in a closed position and FIG. 14 is a perspective view with the clamp assembly 200 in an open position.

The relationship between the actuator lever 150 and the clamp lever 211 with the housing 10 and various other parts of the oscillating tool 100 not shown. As seen in FIGS. 11-14, the lever connecting strip 60 is attached near one end of the actuating lever 150 and the clamp lever 211. In order to pen the clamp assembly 200, the actuating lever 150 is moved from the position of FIGS. 11 and 13 to the position of FIGS. 12 and 14. The actuating lever 150 pulls on one end of the connecting strip 60. In turn, the connecting strip 60 pulls one end of the clamp lever 211 upwardly. This moves the sliding clamp 231 upwardly away from the fixed clamp 230 to expose the lugs 232 and allow an accessory 250 to be inserted into the clamp assembly 200 between the sliding clamp 231 and the fixed clamp 230. The accessory 250 has an open end to allow insertion of the accessory 250.

As can additionally be seen in FIGS. 11-14, the sliding clamp 231 is biased by a spring 50. The spring 50 biases the sliding clamp 231 towards the fixed clamp 230, and thus the clamp assembly 200 to the closed position. This also biases the clamp lever 211 towards the position of FIGS. 11 and 13. The spring 50 provides a clamping force for holding the accessory 250 securely in the clamp assembly 200.

As shown in FIGS. 11-14, the levers 150 and 211 are connected by a lever connecting strip 60. The lever connecting strip 60 is forward of the output shaft 40. Additionally, as shown in FIGS. 13 and 14, the lever connecting strip 60 includes a hole 61. This can, among other things, reduce the amount of material used and allow more flexibility in the strip 60. Other connections or connectors may be used in place of the connecting strip 60.

Figure 15:
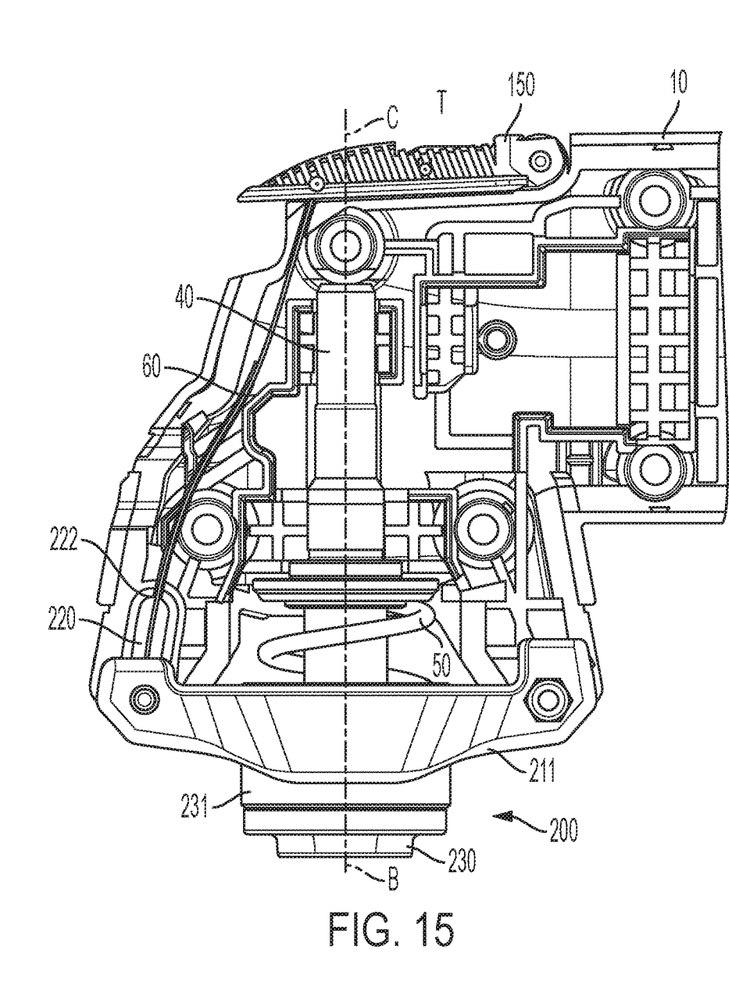
FIG. 15 is a side view of selected components of the oscillating tool of the exemplary embodiment.
Figure 16:
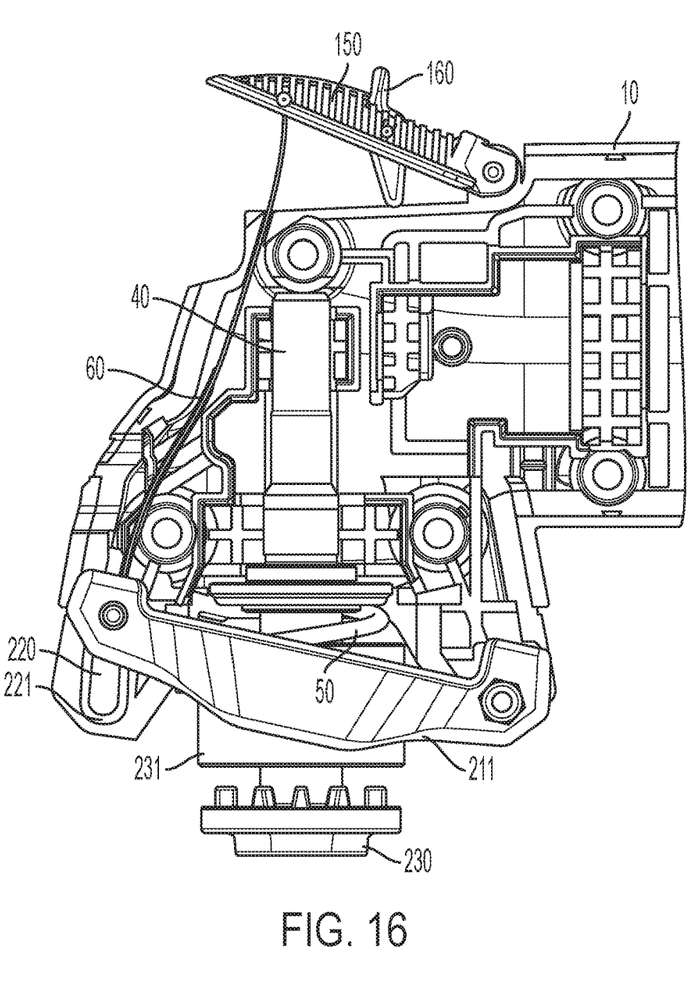
FIG. 16 is another side view of selected components of the oscillating tool of the exemplary embodiment.
Figure 17:
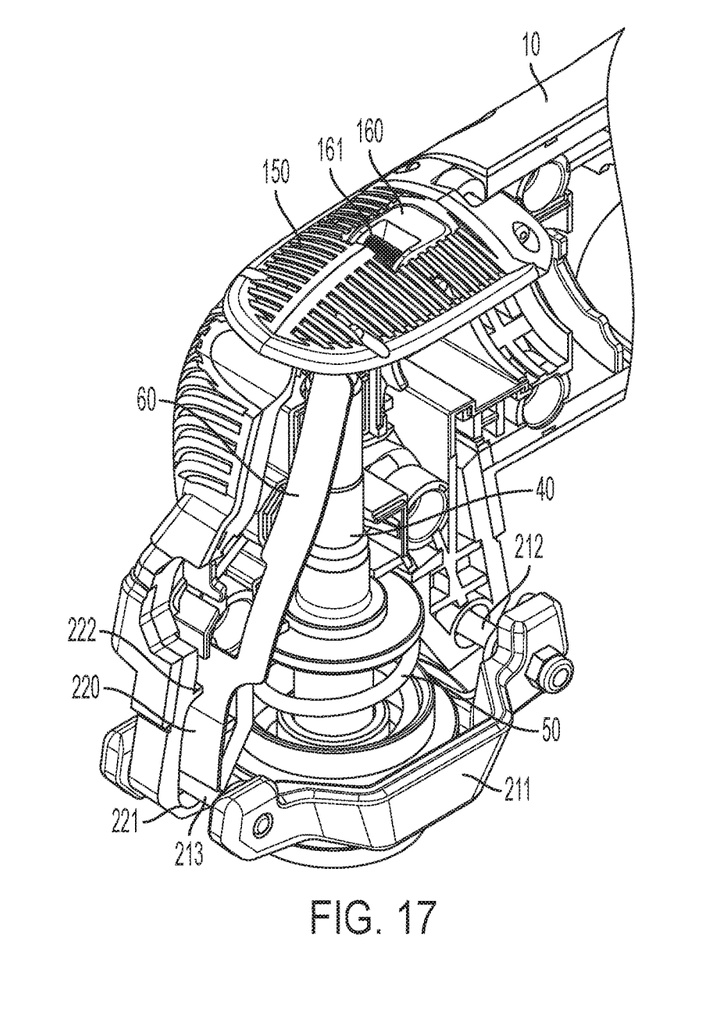
FIG. 17 is a perspective view of selected components of the oscillating tool of the exemplary embodiment.
Figure 18:
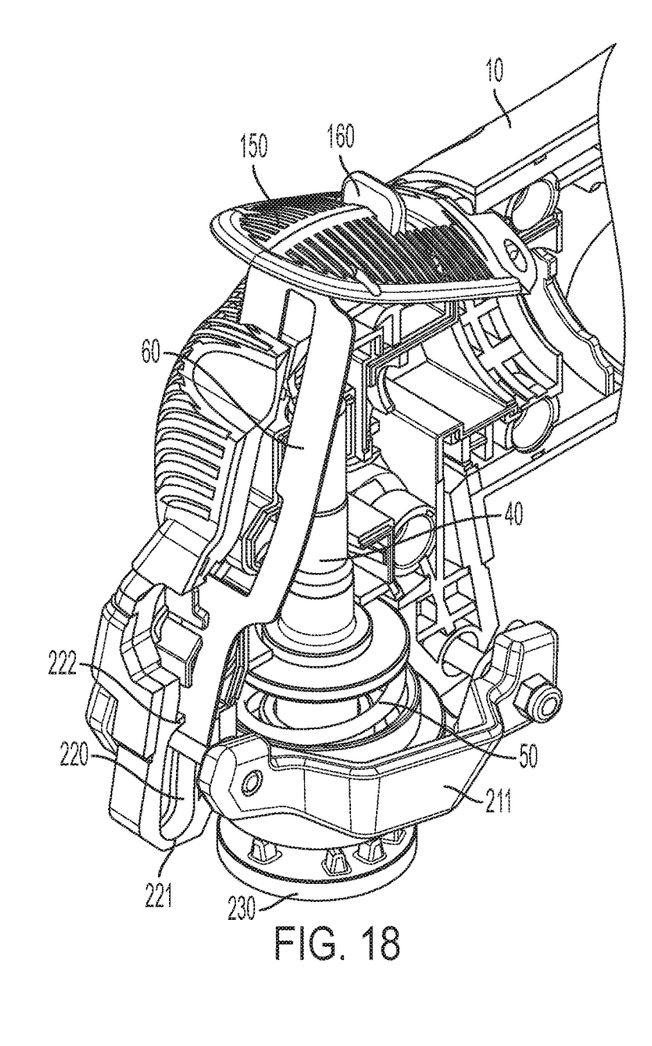
FIG. 18 is another perspective view of selected components of the oscillating tool of the exemplary embodiment.

FIGS. 15-18 are similar to FIGS. 11-14, but additionally includes one side of the housing 10 and illustrate the interaction of the various parts with the housing 10. FIG. 15 is a side view of a portion of the oscillating tool 100 with the clamp assembly 200 in the closed position and FIG. 16 is a side view of the same portion of the oscillating tool 100 with the clamp assembly 200 in the open position. FIG. 17 is a perspective view of a portion of the oscillating tool 100 with the clamp assembly 200 in the closed position and FIG. 18 is a perspective view with the clamp assembly 200 in the open position. As shown in FIGS. 15-18, the pin 213 moves in the guide hole 220 as the lever clamp 211 moves from the closed to the open position. Additionally, when the actuating lever 150 is in the open position, the locking lever 160 can be rotated into a locked open position in which the locking lever 160 abuts a portion of the housing, as is best shown in FIG. 16.

FIG. 19 is a side view of the oscillating tool 10 holding the accessory 250. The accessory 250 may be, for example, a cutting blade or a sanding accessory.

Although the present technology has been described in detail for the purpose of illustration based on what is currently considered to be the most practical and preferred embodiments, it is to be understood that such detail is solely for that purpose and that the technology is not limited to the disclosed embodiments, but, on the contrary, is intended to cover modifications and equivalent arrangements that are within the spirit and scope of the appended claims. For example, it is to be understood that the present technology contemplates that, to the extent possible, one or more features of any embodiment can be combined with one or more features of any other embodiment.

Additionally, while the exemplary embodiment is described with respect to an oscillating tool, the methods and configurations may also apply to or encompass other power tools such as other tools holding accessories.

What is claimed is:

1. An oscillating tool, comprising:
a housing;
a motor housed in the housing;
a clamp assembly operatively driven by the motor in an oscillating motion, the clamp assembly including a first clamp and a second clamp, the clamp assembly being configured to hold an accessory;
a clamp lever, the clamp lever operatively coupled to the first clamp to move the first clamp such that clamp assembly is moved from a closed position to an open position;
an actuating lever, the actuating lever operatively coupled to the clamp lever to effect movement of the clamp lever, movement of the clamp lever causing the clamp assembly to move from the closed position to the open position;

wherein the actuating lever is operatively coupled to the clamp lever through a connector such that the actuating lever is remote from the clamp lever;

wherein the clamp lever is rotatable about a clamp lever axis; and wherein the clamp lever axis is transverse to a longitudinal axis of the motor;

further comprising an output shaft driven by the motor; and wherein a first end of the clamp lever is on a first side of the output shaft;

wherein a second end of the clamp lever is on a second side of the output shaft; and wherein the second end of the clamp lever moves a farther distance than the first end of the clamp lever when the movement of the clamp lever causes the clamp assembly to move from the closed position to the open position.

2. The oscillating tool of claim 1, wherein the connector is a connecting strip.

3. The oscillating tool of claim 1, wherein the clamp assembly is operatively driven by the motor through the output shaft;

wherein the output shaft has a first end and a second end;

wherein the clamp assembly is disposed at the first end; and wherein the actuating lever is disposed adjacent to the second end.

4. The oscillating tool of claim 1, further comprising a locking lever, the locking lever configured to keep the clamp assembly in the open position.

5. The oscillating tool of claim 4, wherein the locking lever is attached to the actuation lever.

6. The oscillating tool of claim 1, further comprising a guide groove which guides movement of the clamp lever.

7. The oscillating tool of claim 1, wherein the first clamp is a sliding clamp.

8. The oscillating tool of claim 1, wherein the second clamp is a fixed clamp.

9. An oscillating tool, comprising:
a housing;
a motor housed in the housing, the motor having a motor longitudinal axis;
an output shaft driven by the motor in an oscillating motion, the output shaft having an output shaft longitudinal axis;
a foot that receives a power supply for powering the motor;
a clamp assembly operatively driven by the motor through the output shaft in an oscillating motion, the clamp assembly including a first clamp and a second clamp and being configured to hold an accessory;
a clamp lever; and
an actuating lever;
wherein the clamp lever is operatively coupled to the actuating lever;
wherein the actuating lever is configured to be movable by a user; and
wherein movement of the actuating lever causes the clamp lever to move and cause the clamp assembly to change from a closed position to an open position;
wherein the oscillating tool has a front and a rear;
wherein the foot is at the rear of the oscillating tool;
wherein the clamp assembly is at the front of the oscillating tool;
wherein the clamp lever comprises a front end and a rear end;
wherein the clamp lever pivots about an axis at the rear end.

10. The oscillating tool of claim 9, wherein the actuating lever is at the front of the oscillating tool.

11. The oscillating tool of claim 9, wherein the actuating lever is at a top of the oscillating tool; and
wherein the clamp assembly is at a bottom of the oscillating tool.

12. The oscillating tool of claim 9, further comprising a locking lever, the locking lever configured to keep the clamp assembly in the open position.

13. The oscillating tool of claim 9, further comprising a guide groove which guides movement of the clamp lever.

14. The oscillating tool of claim 9, wherein the first clamp is a sliding clamp.

15. An oscillating tool, comprising:
a housing;
a motor housed in the housing;
a clamp assembly operatively driven by the motor in an oscillating motion, the clamp assembly including a first clamp and a second clamp and being configured to hold an accessory;
a clamp lever;
an actuator, the actuator being remote from the clamp lever and effecting movement of the clamp lever so as to open the clamp assembly and allow the accessory to be inserted or removed from the clamp assembly;
wherein the clamp lever comprises a first end and a second end;
wherein the clamp lever pivots about a clamp lever axis;
wherein the axis is at the first end of the clamp lever; and
wherein the second end of the clamp lever is remote from the clamp lever axis.

16. The oscillating tool of claim 15, wherein the clamp lever axis is defined by a pin.

17. The oscillating tool of claim 15, further comprising an output shaft driven by the motor;
wherein the first end of the clamp lever is on a first side of the output shaft; and
wherein the second end of the clamp lever is on a second side of the output shaft.

* * * * *